US012652388B2

(12) United States Patent
Chen et al.

(10) Patent No.: US 12,652,388 B2
(45) Date of Patent: Jun. 9, 2026

(54) RESIDUAL COEFFICIENT SIGN PREDICTION WITH ADAPTIVE COST FUNCTION FOR INTRA PREDICTION MODES

(71) Applicant: InterDigital CE Patent Holdings, SAS, Paris (FR)

(72) Inventors: Ya Chen, Rennes (FR); Karam Naser, Mouazé (FR); Franck Galpin, Thorigne-Fouillard (FR); Federico Lo Bianco, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/856,292

(22) PCT Filed: Apr. 4, 2023

(86) PCT No.: PCT/EP2023/058868
§ 371 (c)(1),
(2) Date: Oct. 11, 2024

(87) PCT Pub. No.: WO2023/198535
PCT Pub. Date: Oct. 19, 2023

(65) Prior Publication Data
US 2025/0274583 A1      Aug. 28, 2025

(30) Foreign Application Priority Data

Apr. 11, 2022      (EP) ..................................... 22305522

(51) Int. Cl.
*H04N 19/11*          (2014.01)
*H04N 19/105*          (2014.01)
(Continued)

(52) U.S. Cl.
CPC ........... *H04N 19/11* (2014.11); *H04N 19/105* (2014.11); *H04N 19/176* (2014.11); *H04N 19/196* (2014.11)

(58) Field of Classification Search
CPC .... H04N 19/11; H04N 19/105; H04N 19/176; H04N 19/196
(Continued)

(56) References Cited

U.S. PATENT DOCUMENTS

2007/0002945 A1* 1/2007 Kim ...................... H04N 19/11
                                                              375/240
2017/0353719 A1* 12/2017 Liu ...................... H04N 19/156
(Continued)

FOREIGN PATENT DOCUMENTS

WO          2018/110281 A1       6/2018
WO          2018/119233 A1       6/2018

OTHER PUBLICATIONS

Chang et al., "Compression Efficiency Methods Beyond VVC", JVET-U0100, Qualcomm Incorporated, Joint Video Experts Team (JVET) of ITU-T SG 16 WP 3 and ISO/IEC JTC 1r/SC 29, 21st Meeting, by Teleconference, Jan. 6-15, 2021, pp. 1-13.
(Continued)

*Primary Examiner* — Allen C Wong
(74) *Attorney, Agent, or Firm* — Condo Roccia Koptiw LLP

(57) ABSTRACT

Systems, methods, and instrumentalities are disclosed for performing video coding using residual coefficient sign prediction with an adaptive cost function for intra prediction modes. An adaptive cost function for intra prediction modes (IPMs) may include multiple (e.g., selectable) cost functions, such as a default or standard cost function, a horizontal cost function, a vertical cost function, a diagonal up-right cost function, a diagonal down-right cost function, and/or a
(Continued)

300 diagonal down-left cost function. A cost function may be selected based on one or more rules, which may be based on an IPM and a corresponding IPM index. An adaptive cost function for IPMs may include a cost function for multiple (e.g., all) directions. A cost function for multiple directions may include weighting factors related to an IPM and corresponding IPM index. A weighting parameter between the top and the left border continuity cost may be deduced from the IPM index.

20 Claims, 16 Drawing Sheets

(51) Int. Cl.
  *H04N 19/176*        (2014.01)
  *H04N 19/196*        (2014.01)
(58) Field of Classification Search
  USPC .................................................... 375/240.12
  See application file for complete search history.

(56)                  References Cited

U.S. PATENT DOCUMENTS

2022/0014732 A1    1/2022  Filippov et al.
2022/0239897 A1*   7/2022  Deng ................... H04N 19/184

2022/0312043 A1*   9/2022  Seregin ................. H04N 19/70

OTHER PUBLICATIONS

Chen et al., "Description of SDR, HDR and 360° video coding technology proposal by Qualcomm and Technicolor—low and high complexity versions", JVET-J0021, Qualcomm, Technicolor, Joint Video Exploration Team (JVET) of ITU-T SG 16 WP 3 and ISO/IEC JTC 1/SC 29/WG 11, 10th Meeting, San Diego, US, Apr. 10-20, 2018, pp. 1-43.
Henry et al., "Residual Coefficient Sign Prediction", JVET-D0031, Joint Video Experts Team (JVET) of ITU-T SG 16 WP 3 and ISO/IEC JTC 1/SC 29/WG 11, 4th Meeting, Chengdu, CN, Orange, Oct. 15-21, 2016, 6 pages.
Sullivan et al., "Overview of the High Efficiency Video Coding (HEVC) Standard", IEEE Transactions on Circuits and Systems for Video Technology, vol. 22, No. 12, Dec. 2012, pp. 1649-1668.
Wang et al., "EE2-Related: Template-Based Intra Mode Derivation Using MPMs", ByteDance Inc., JVET-V0098, Joint Video Experts Team (JVET) of ITU-T SG 16 WP 3 and ISO/IEC JTC 1/SC 29, 22nd Meeting, by Teleconference, Apr. 20-28, 2021, 4 pages.
Yoo et al., "EE2-related: On directional planar prediction", JVET-AB0104-v2, LG Electronics Inc., Joint Video Experts Team (JVET) of ITU-T SG 16 WP 3 and ISO/IEC JTC 1/SC 29 28th Meeting, Mainz, DE, Oct. 20-28, 2022, 3 pages.

* cited by examiner

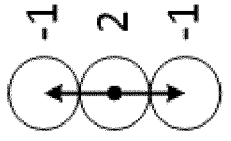
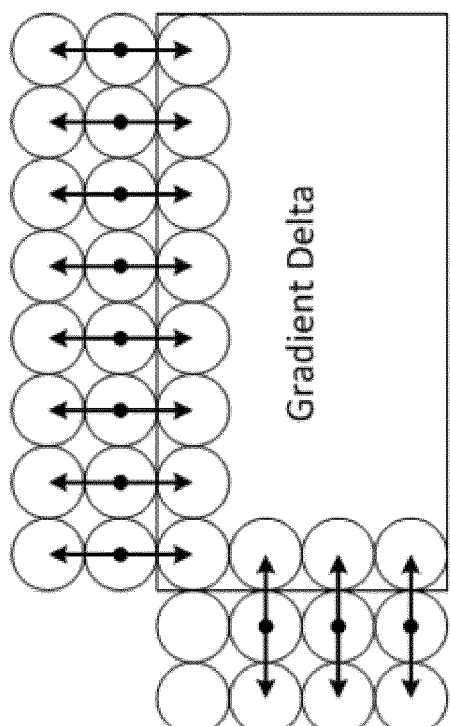
FIG. 5
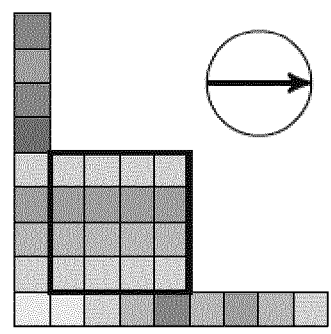
FIG. 6D
FIG. 6C
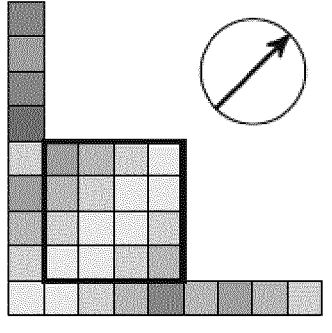
FIG. 6B
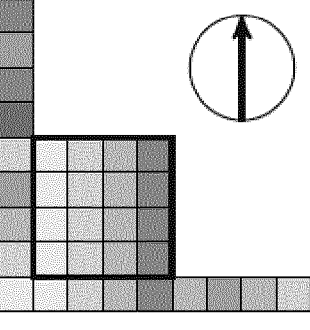
FIG. 6A

0: Planar
1: DC $$\omega_1 = \frac{43}{64} \times \frac{ampl(M_1)}{ampl(M_1)+ampl(M_2)}$$

$$\omega_2 = \frac{43}{64} \times \frac{ampl(M_2)}{ampl(M_1)+ampl(M_2)}$$

$$\omega_3 = \frac{21}{64}$$

$$\sum_{i=1}^{3} \omega_i \times Pred_i$$

1

RESIDUAL COEFFICIENT SIGN PREDICTION WITH ADAPTIVE COST FUNCTION FOR INTRA PREDICTION MODES

CROSS-REFERENCE TO RELATED APPLICATIONS

This application is the National Stage Entry under 35 U.S.C. § 371 of Patent Cooperation Treaty Application No. PCT/EP2023/058868, filed Apr. 4, 2023, which claims the benefit of European Patent application Ser. No. 22/305, 522.9, filed Apr. 11, 2022, the contents of which are hereby incorporated by reference in their entirety.

BACKGROUND

Video coding systems may be used to compress digital video signals, e.g., to reduce the storage and/or transmission bandwidth needed for such signals. Video coding systems may include, for example, block-based, wavelet-based, and/or object-based systems.

SUMMARY

Systems, methods, and instrumentalities are disclosed for performing residual coefficient sign prediction using an adaptive cost function. A video device, which may be a video encoding and/or video decoding device, may be configured to obtain a plurality of cost functions for predicting a residual hypothesis. Each of the plurality of cost functions may be associated with a respective intra prediction direction.

The video device may be configured to select, based on information associated with an intra prediction mode associated with a coding block, a cost function from the plurality of cost functions for predicting a residual hypothesis for the coding block. The information associated with the intra prediction mode may be or may include an intra prediction mode associated with the coding block (e.g., decoder-side intra mode derivation (DIMD) mode, matrix-weighted intra prediction (MIP) mode, template-based intra mode derivation (TIMD) mode, etc.). The information associated with the intra prediction mode may be or may include an intra prediction mode index associated with the coding block.

The video device may determine, based on the information associated with an intra prediction mode associated with a coding block, an intra prediction mode associated with the coding block. The video device may be configured to select the cost function based on the determined intra prediction mode associated with the coding block.

The video device may determine that the information associated with the intra prediction mode indicates that a decoder-side intra mode derivation (DIMD) mode is associated with or used for the coding block. The video device may select, based on the indication that the DIMD mode is used for the coding block, a cost function associated with the horizontal direction and the vertical direction.

The video device may determine that the information associated with the intra prediction mode indicates that a matrix-weighted intra prediction (MIP) mode is associated with or used for the coding block. The video device may select, based on a MIP mode being used for the coding block, a cost function associated with horizontal direction and vertical direction.

The video device may determine that the information associated with the intra prediction mode indicates an intra prediction mode index associated with a horizontal direction. The intra prediction mode index associated with the horizontal direction may be, for example, in the range of 11 to 26. The video device may select a cost function that is associated with the horizontal direction. The selected cost function associated with the horizontal direction may be configured to calculate a cost based on a residual hypothesis, a plurality of reconstructed neighbor pixels to the left of the coding block, and a plurality of predicted sample values on the left edge of the coding block.

The video device may determine that the information associated with the intra prediction mode indicates an intra prediction mode index associated with a vertical direction. The intra prediction mode index associated with the vertical direction may be, for example, in the range of 43 to 58. The video device may select a cost function that is associated with the vertical direction. The selected cost function associated with the vertical direction may be configured to calculate a cost based on a residual hypothesis, a plurality of reconstructed neighbor pixels located above the coding block, and a plurality of predicted sample values on a top edge of the coding block.

The video device may determine that the information associated with the intra prediction mode indicates an intra prediction mode index associated with a diagonal up-right direction. The intra prediction mode index associated with the diagonal up-right direction may be, for example, in the range of 2 to 10. The video device may select a cost function associated with the diagonal up-right direction. The selected cost function associated with the diagonal up-right direction may be configured to calculate a cost based on a residual hypothesis, a plurality of reconstructed neighbor pixels located downward and leftward of pixels in the coding block, and a plurality of predicted sample values on a left edge of the coding block.

The video device may determine that the information associated with the intra prediction mode indicates an intra prediction mode index associated with a diagonal down-right direction. The intra prediction mode index associated with the diagonal down-right direction may be, for example, in the range of 27 to 42. The video device may select a cost function associated with the diagonal down-right direction. The selected cost function associated with the diagonal down-right direction may be configured to calculate a cost based on a residual hypothesis, a plurality of reconstructed neighbor pixels located above and leftward of pixels in the coding block, and a plurality of predicted sample values on a left edge and a top edge of the coding block.

The video device may determine that the information associated with the intra prediction mode indicates an intra prediction mode index associated with a diagonal down-left direction. The intra prediction mode index associated with the diagonal down-left direction may be, for example, in the range of 59 to 66. The video device may select a cost function associated with the diagonal down-left direction. The selected cost function associated with the diagonal down-left direction may be configured to calculate a cost based on a residual hypothesis, a plurality of reconstructed neighbor pixels located above and rightward of pixels in the coding block, and a plurality of predicted sample values on a top edge of the coding block.

The video device may determine that the information associated with the intra-prediction mode comprises an indication associated with template-based intra mode derivation (TIMD), a first intra prediction mode index, and a second intra prediction mode index. The video device may determine the selected cost function is a cost function associated with one of the first intra prediction mode index and the second intra prediction mode index. The one of the first intra prediction mode index and the second intra prediction mode index may be associated with one of a horizontal direction, a vertical direction, a diagonal up-right direction, a diagonal down-right direction, and a diagonal down-left direction.

The video device may be configured to predict a residual coefficient sign based on the selected cost function. The video device may be configured to decode the coding block based on the predicted residual coefficient sign.

A plurality of residual hypotheses for an intra-predicted coding block may be used for encoding and/or decoding. A cost function may be selected from multiple potential cost functions based on the intra prediction mode associated with the coding block and/or the intra prediction mode index. The residual coefficient sign may be predicted based on the plurality of residual hypotheses and the selected cost function. For example, the residual hypotheses, e.g., the best residual hypothesis, may be selected using the selected cost function, and the predicted sign may be determined based on the best residual hypothesis.

An adaptive cost function for intra prediction modes (IPMs) may include (e.g., be selected from) multiple cost functions, such as a default or standard cost function, a horizontal cost function $cost_{horiz}$, a vertical cost function $cost_{vert}$, a diagonal up-right cost function $cost_{diag\_ur}$, a diagonal down-right cost function $cost_{diag\_dr}$, a diagonal down-left cost function $cost_{diag\_df}$ and/or the like. A cost function may be selected based on the IPM and/or the corresponding IPM index. An adaptive cost function for IPMs may include a cost function for multiple directions. A cost function for multiple directions may include weighting factors related to an IPM and the corresponding IPM index. A weighting parameter between the top and the left border continuity cost may be deduced from the IPM index.

Systems, method s, and instrumentalities described herein may involve a decoder. In some examples, the systems, methods, and instrumentalities described herein may involve an encoder. In some examples, the systems, methods, and instrumentalities described herein may involve a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

BRIEF DESCRIPTION OF THE DRAWINGS

FIG. 5 illustrates an example of linear prediction using reconstructed pixels around a current block.

FIGS. 6A-6D illustrate an example of directional intra prediction with reference neighbor samples.

DETAILED DESCRIPTION

A more detailed understanding may be had from the following description, given by way of example in conjunction with the accompanying drawings.

Figure 1A:
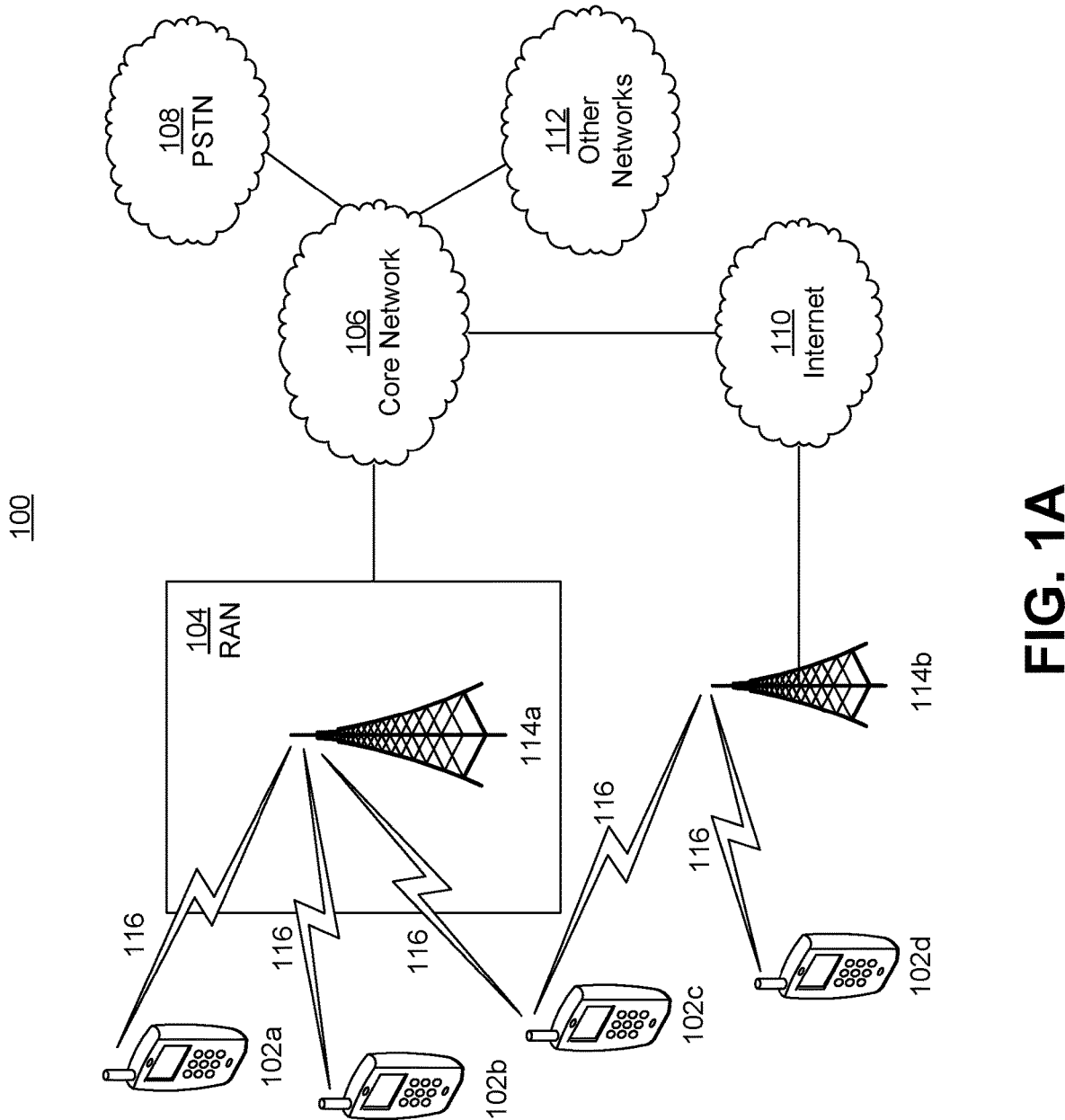
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
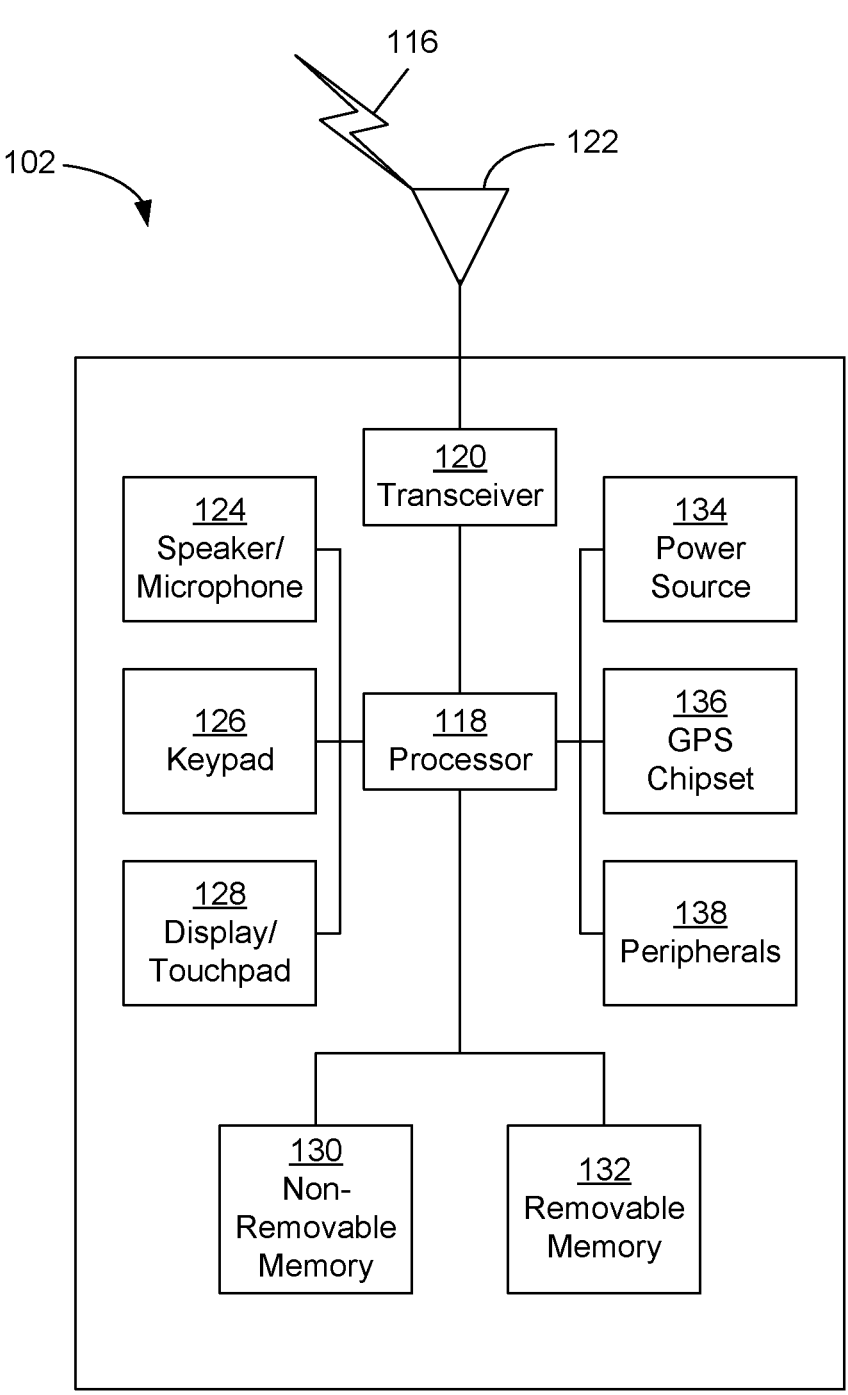
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
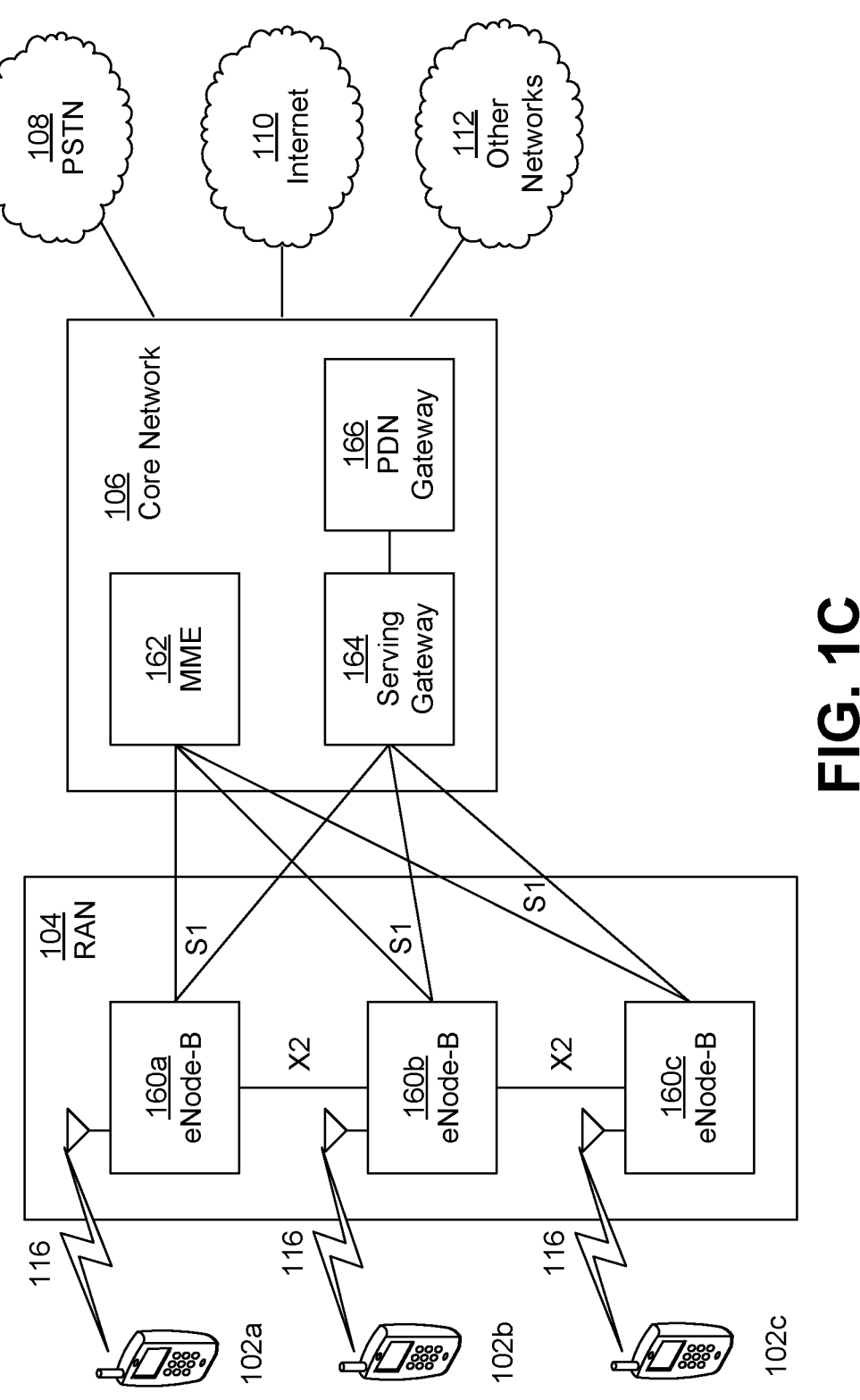
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHz, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHz, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
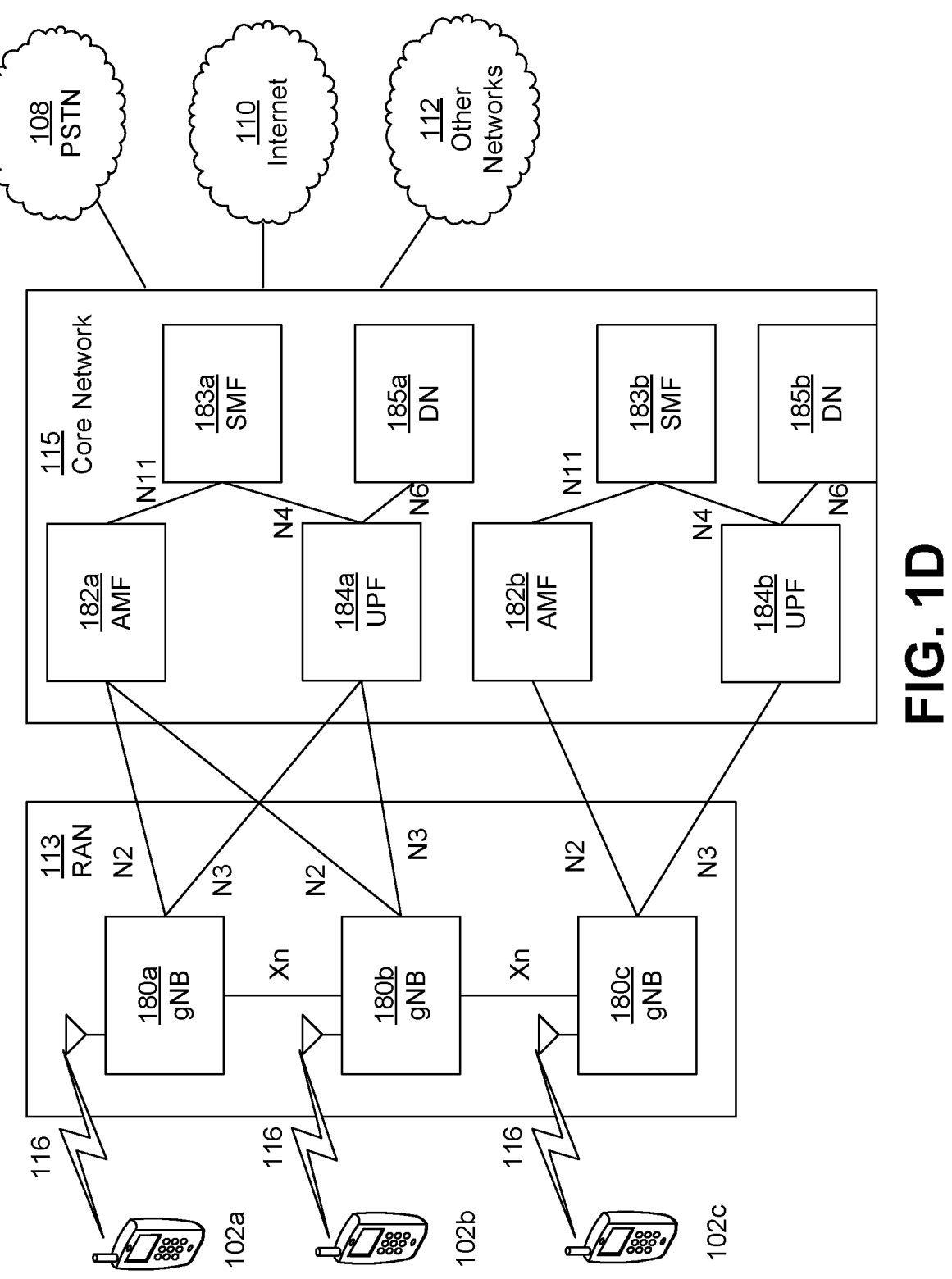
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-13 described herein may provide some examples, but other examples are contemplated. The discussion of FIGS. 5-13 does not limit the breadth of the implementations. At least one of the aspects generally relates to video encoding and decoding, and at least one other aspect generally relates to transmitting a bitstream generated or encoded. These other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
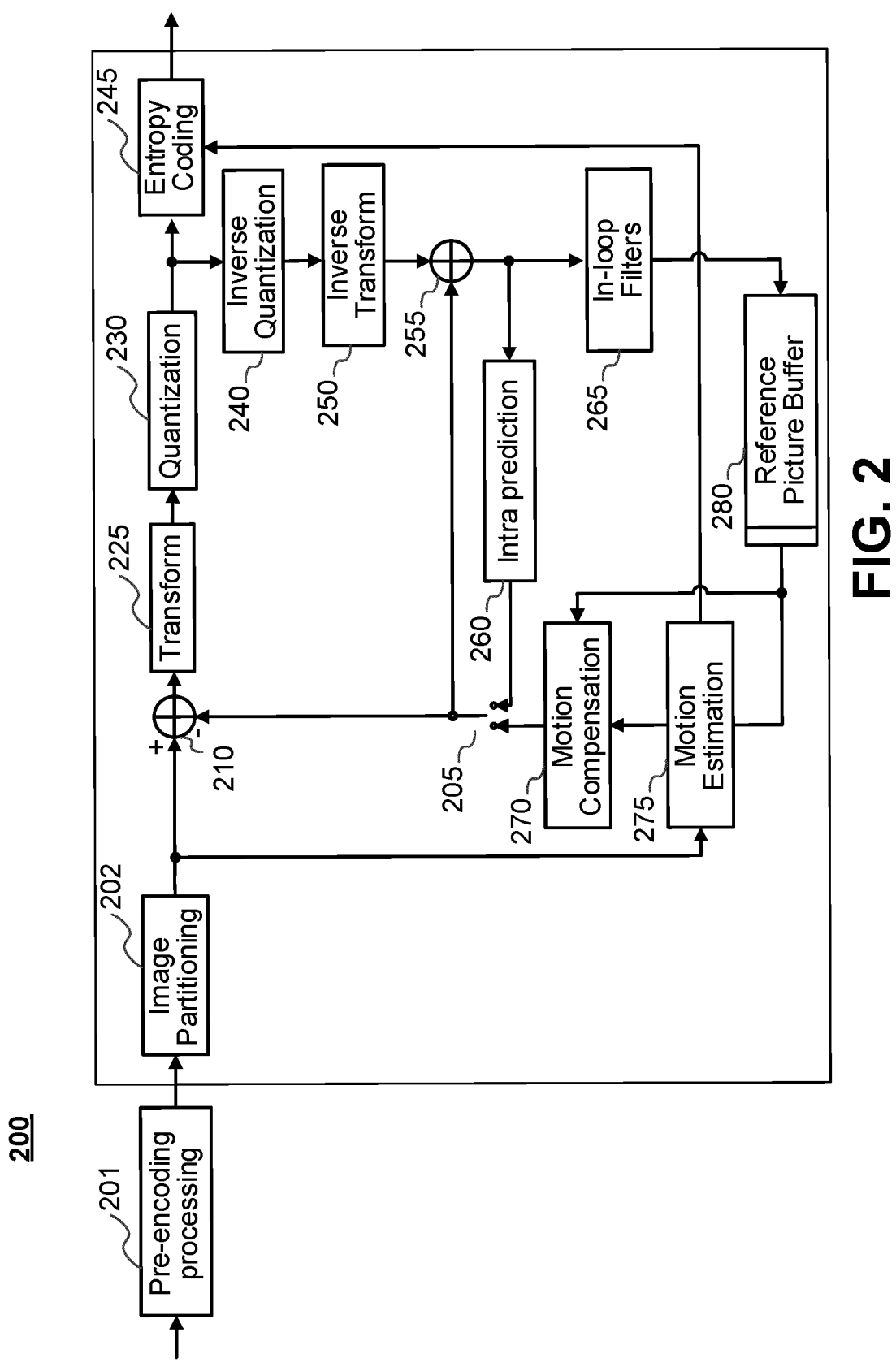
FIG. 2 illustrates an example video encoder.
Figure 3:
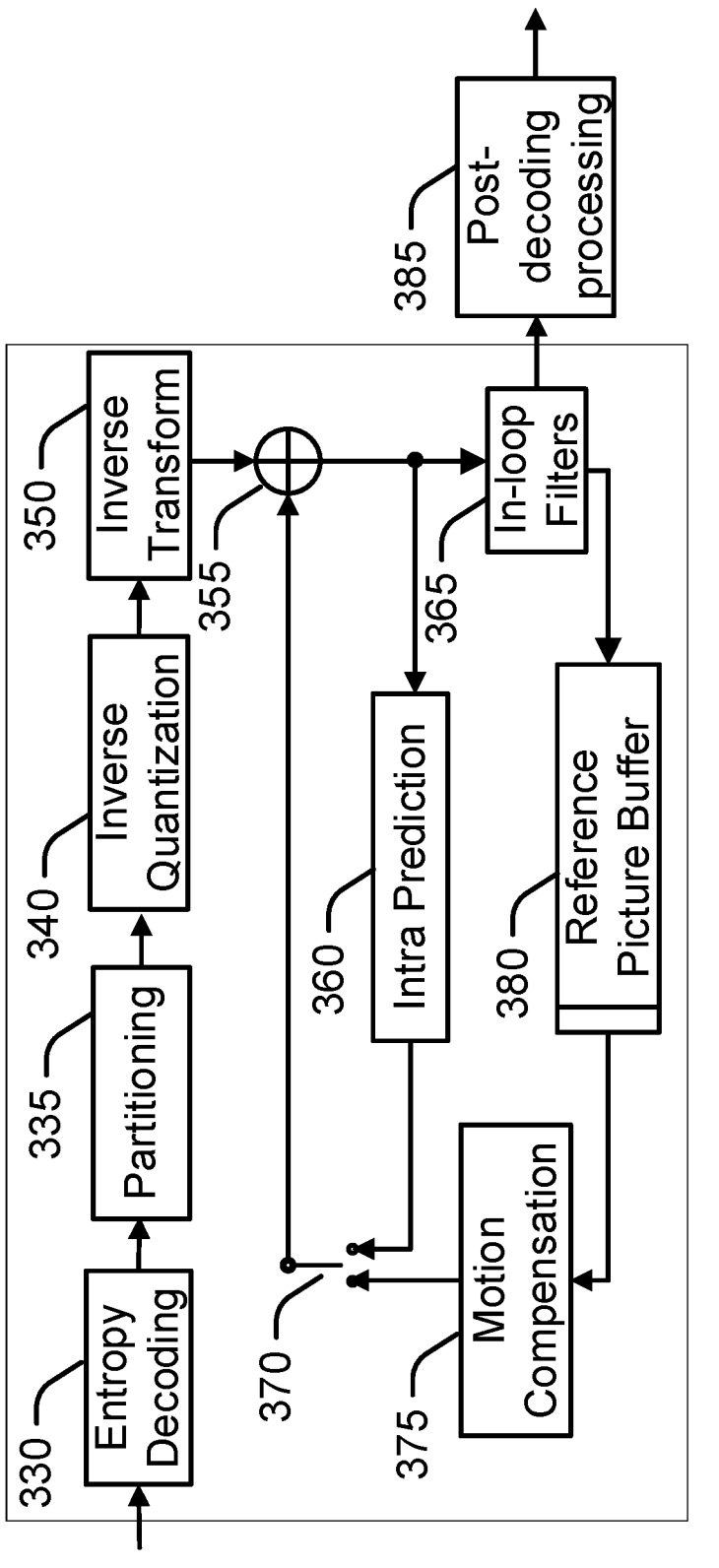
FIG. 3 illustrates an example video decoder.

Various implementations and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application, such as the number of intra prediction modes, the number of intra prediction modes indices, the number of cost functions, block size dimensions, ratios of block height to block width, prediction mode indices, wide angle intra prediction (WAIP) modes, degree of angles, angular mode ranges, weight values, etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, such as picture partitioning information, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset)/ALF (Adaptive Loop Filtering) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded (330) to obtain transform coefficients, prediction modes, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380). In some examples (e.g., for a given picture) the contents of the reference picture buffer 380 on the decoder 300 side may be identical to the contents of the reference picture buffer 280 on the encoder 200 side (e.g., for the same picture).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (e.g., after application of the in-loop filters (365) and/or after post-decoding processing (385), if post-decoding processing is used) may be sent to a display device for rendering to a user.

Figure 4:
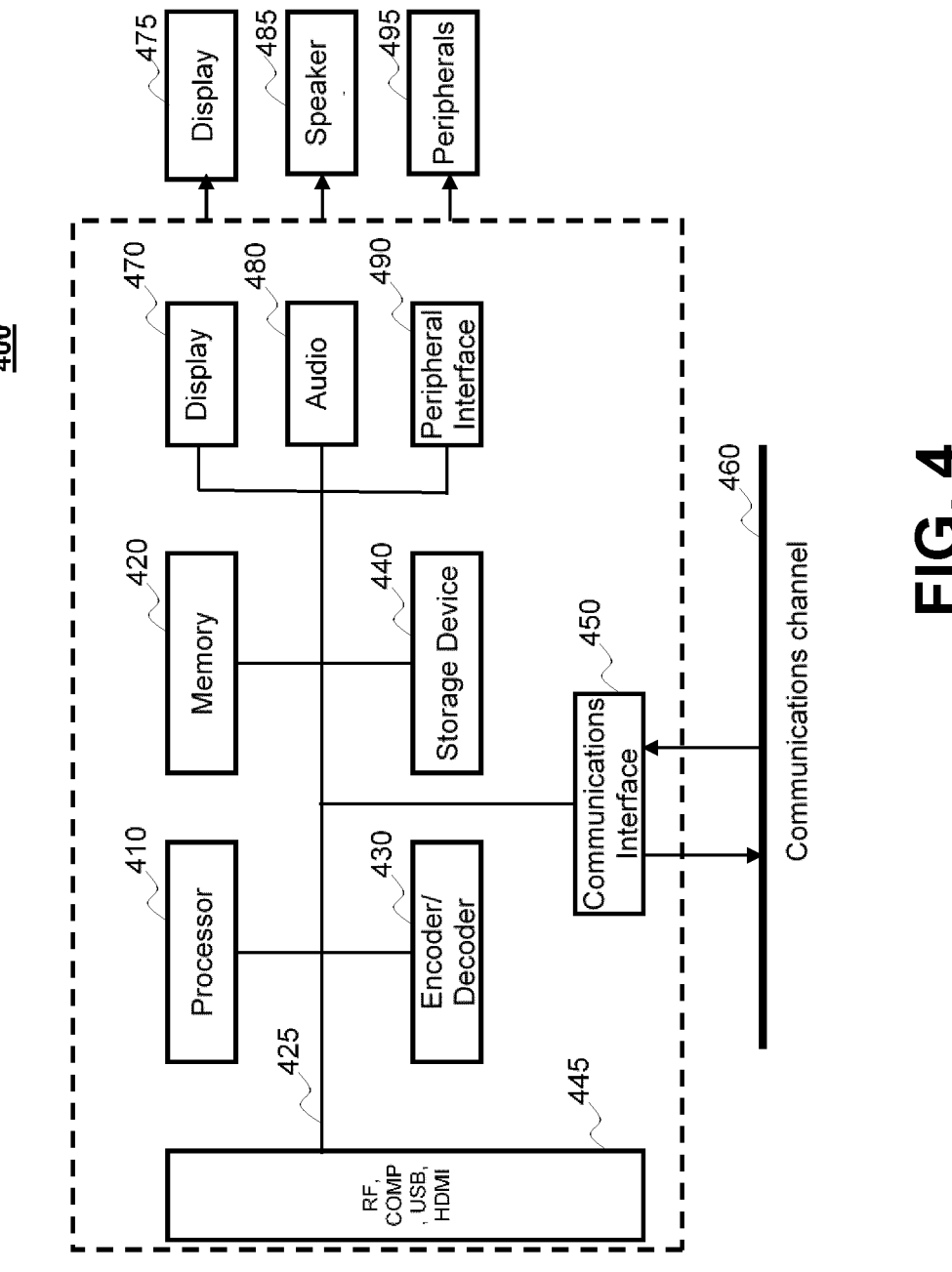
FIG. 4 illustrates an example system in which various aspects and examples may be implemented.

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet comput-ers, digital multimedia set top boxes, digital television receivers, personal video recording systems, connected home appliances, and servers. Elements of system 400, singly or in combination, may be embodied in a single integrated circuit (IC), multiple ICs, and/or discrete compo-nents. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for imple-menting, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Ran-dom Access Memory (DRAM), Static Random Access Memory (SRAM), flash, magnetic disk drive, and/or optical disk drive. The storage device 440 can include an internal storage device, an attached storage device (including detach-able and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subse-quently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the process-ing of equations, formulas, operations, and operational logic.

Memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory

420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 may be provided through various input devices as indicated in block 445. Such input devices include, but are not limited to, (i) a radio frequency (RF) portion that receives an RF signal transmit-ted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

The input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and/or (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

The USB and/or HDMI terminals can include respective interface processors for connecting system 400 to other electronic devices across USB and/or HDMI connections. It is to be understood that various aspects of input processing, for example, Reed-Solomon error correction, may be imple-mented, for example, within a separate input processing IC or within processor 410 as necessary. Similarly, aspects of USB or HDMI interface processing may be implemented within separate interface ICs or within processor 410 as necessary. The demodulated, error corrected, and demulti-plexed stream is provided to various processing elements, including, for example, processor 410, and encoder/decoder 430 operating in combination with the memory and storage elements to process the datastream as necessary for presen-tation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (12C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touchscreen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

Control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. The output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 may be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, obtaining a plurality of residual hypotheses for a coding block; obtaining a cost function from an adaptive cost function based on at least one of an intra prediction mode selected to predict the coding block and an intra prediction mode index; and selecting a residual hypothesis from the plurality of residual hypotheses based on the cost function, etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, obtaining a plurality of residual hypotheses for a coding block; obtaining a cost function from an adaptive cost function based on at least one of an intra prediction mode selected to predict the coding block and an intra prediction mode index; and selecting a residual hypothesis from the plurality of residual hypotheses based on the cost function, etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, coding syntax on dimd_flag, mip_flag, timd_flag, etc., are descriptive terms. As such, they do not preclude the use of other syntax element names.

If a figure is presented as a flow diagram, it should be understood that it also provides a block diagram of a corresponding apparatus. Similarly, if a figure is presented as a block diagram, it should be understood that it also provides a flow diagram of a corresponding method/process.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, an MIP matrix index, a dimd_flag, an mip_flag, a timd_flag, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on, or accessed or received from, a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (e.g., using a monitor, screen, or other type of display) a resulting image (e.g., an image from residual reconstruction of the video bitstream). The TV, set-top box, cell phone, tablet, or other electronic device may receive a signal including an encoded image and perform decoding.

Systems, methods, and instrumentalities are disclosed for residual coefficient sign prediction using an adaptive cost function. A video device may be configured to select, based on information associated with an intra prediction mode associated with a coding block, a cost function from the plurality of cost functions for predicting a residual hypothesis for the coding block. The information associated with the intra prediction mode may comprise at least one of an indication of one or more intra prediction modes or an intra prediction mode index. The video device may determine, based on the information associated with an intra prediction mode, an intra prediction mode associated with the coding block, and may select the cost function based on the determined intra prediction mode. The video device may determine, based on the information associated with an intra prediction mode, an intra prediction mode index associated with the coding block, and may select the cost function based on the determined intra prediction mode index. The video device may be configured to predict a residual coefficient sign based on the selected cost function and to decode the coding block based on the predicted residual coefficient sign.

Residual coefficient sign prediction with adaptive cost function to intra prediction modes may be implemented in the context of video compression. Residual coefficient sign prediction with adaptive cost function to intra prediction modes may adapt a border discontinuity measure to the intra prediction modes, which may be used to calculate the cost function for residual coefficient sign prediction.

Compression efficiency may be improved, for example, by reducing the bitrate while maintaining the quality, or (e.g., equivalently) to improve the quality while maintaining the bitrate.

Residual coefficient sign prediction may be implemented in video codecs. For example, a residual coding process may be implemented in video coding. Residual coefficient sign prediction is a coding tool that may be used to compress some signs of residual coefficients using a system of prediction. A sign that has been predicted may or may not be EP-signaled in the bitstream. The sign may be replaced by a "residual" indicating whether the prediction is correct. The residual may be signaled using an associated CABAC context.

A coefficient sign prediction implementation may include (e.g., applicable) transform coefficients that may be used to calculate a reconstructed residual for negative and positive sign combinations and/or select a hypothesis that minimizes a cost function. For example, two signs may be predicted. There may be four (4) possible combinations, such as (+, +), (+, −), (−, +), (−, −). The cost function may be calculated for the four combinations. The combination with the minimum cost may be selected as a sign predictor combination.

A cost function may be defined to derive a (e.g., the best) sign prediction hypothesis among (e.g., all) possible combinations. In some examples, a cost function may be defined as a discontinuity measure across a block boundary. A cost function may be measured for one or multiple (e.g., some or all) hypotheses. A hypothesis with the smallest cost may be selected as a predictor for coefficient signs.

FIG. 5 illustrates an example of linear prediction using reconstructed pixels around a current block. FIG. 5 shows each prediction pixel $P_{0,y}$ at the first left column of the current block. A (e.g., simple) linear prediction may be performed using two reconstructed pixels to the left of a prediction pixel $P_{0,y}$ to obtain a predicted residual $Resi_{0,y}$, for example, in accordance with Eq. (1):

$$Resi_{0,y} = (2R_{-1,y} - R_{-2,y} - P_{0,y}) \tag{1}$$

The absolute difference between the predicted residual $Resi_{0,y}$ and the residual hypothesis $r_{0,y}$ may be added to the cost of the hypothesis.

Similar processing may occur for pixels in the top row of the current block, for example, in accordance with Eq. (2):

$$Resi_{x,0} = (2R_{x,-1} - R_{x,-2} - P_{x,0}) \tag{2}$$

The absolute differences between the (e.g., each) predicted residual $Resi_{x,0}$ and the residual hypothesis $r_{x,0}$ may be added to the cost of the hypothesis.

A cost function may be mathematically modeled, for example, in accordance with Eq. (3):

$$cost = \sum_{x=0}^{w}|(-R_{x,-2} + 2R_{x,-1} - P_{x,0}) - r_{x,0}| + \sum_{y=0}^{h}|(-R_{-2,y} + 2R_{-1,y} - P_{0,y}) - r_{0,y}| \tag{3}$$

In Eq. (3), P may denote a prediction signal of the current block; R may denote the reconstructed neighbors; and r may denote the residual hypothesis. The term $(-R_{-2}+2R_{-1}-P_0)$ may be calculated (e.g., once) per block and the residual hypothesis may be subtracted from the term.

Intra prediction modes may be implemented in video codecs. Intra prediction may be used to remove correlation within local regions of a picture. Texture of a picture region may be similar to the texture in the local neighborhood, which may support prediction. Neighboring samples may be used for prediction (e.g., samples from the sample line above the current block and samples from the last column of the reconstructed blocks to the left of the current block).

Reference neighbor samples used for predicting the current block may depend on the direction indicated by the intra prediction angle of the respective intra prediction mode. FIGS. 6A-6D illustrate an example of directional intra prediction with reference neighbor samples. For example, reference neighbor samples from the left column may be used (e.g., for horizontal prediction); reference neighbor samples from the above row may be used (e.g., for vertical prediction); reference neighbor samples from the above-left side may be applied (e.g., for diagonal down right prediction) and reference neighbor samples from the above-right side may be applied (e.g., for diagonal down left prediction).

Figure 7:
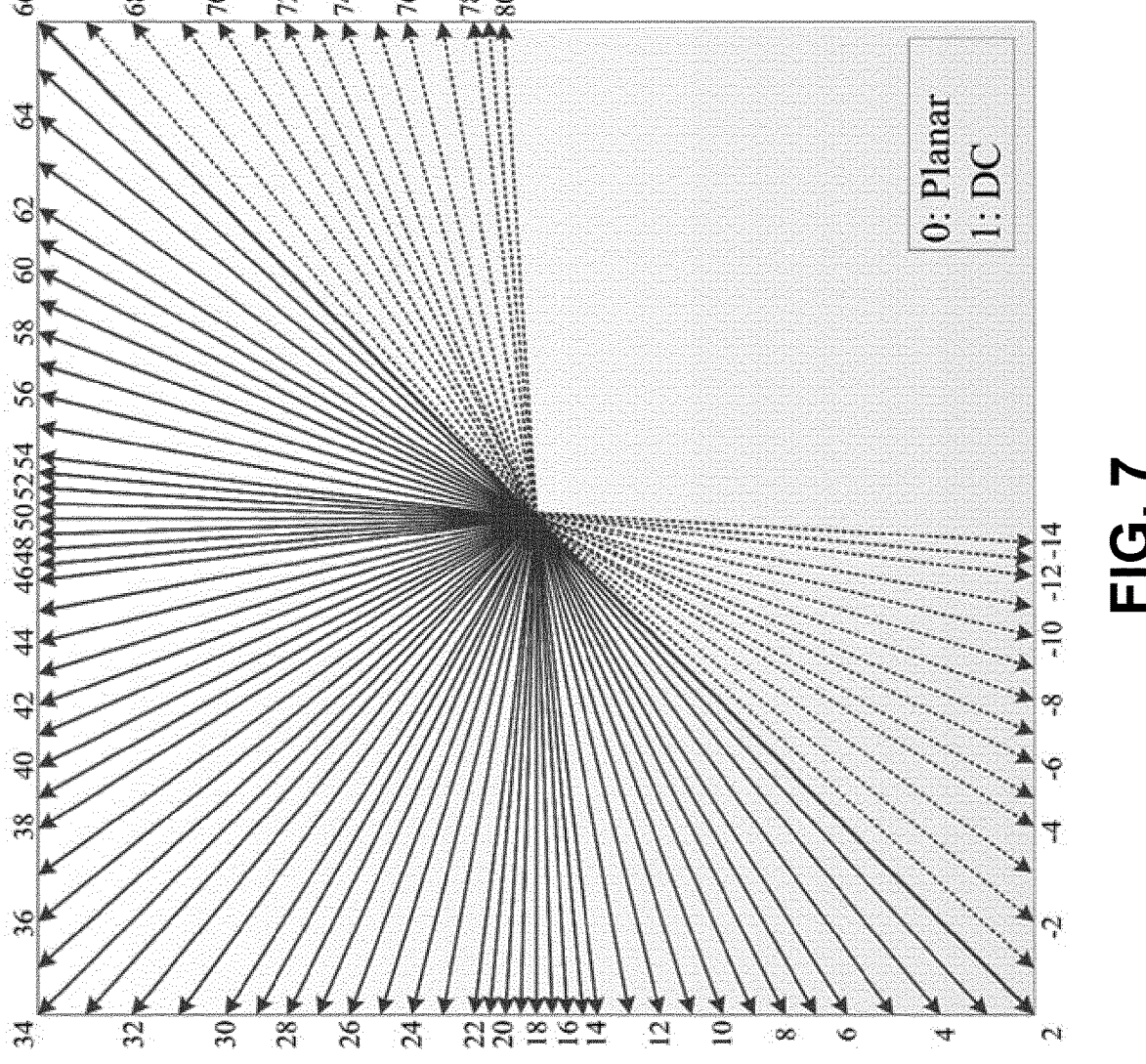
FIG. 7 illustrates an example of directional intra prediction modes.

Intra mode coding may be performed with multiple (e.g., 67) intra prediction modes. FIG. 7 illustrates example directional intra prediction modes. FIG. 7 shows an example of capturing arbitrary edge directions presented in natural video with multiple directional intra modes (e.g., 33, 65 directional intra prediction modes). Intra prediction may implement Planar and DC modes. Denser directional intra prediction modes may be applied for one or more (e.g., all) block sizes, for example, including luma and/or chroma intra predictions.

Angular intra prediction modes (e.g., modes 2-66) may be used for a square CU. Angular intra prediction modes (e.g., modes 2-66) may correspond to angular intra prediction directions that are defined from 45 degrees to –135 degrees in a clockwise direction.

Wide-angle intra prediction modes may be used for non-square blocks. One or more (e.g., several) angular intra prediction modes may be adaptively replaced with wide angular intra prediction modes for non-square blocks. FIG. 7 shows dotted arrows indicating wide angular modes beyond the bottom-left direction modes indexed from –14 to –1. FIG. 7 shows wide angular modes beyond the top-right direction indexed from 67 to 80. Wide angular modes may replace a (e.g., an equal) number of angular modes in the opposite direction, for example, for flat blocks (W>H) and/or tall blocks (W<H).

Figure 8:
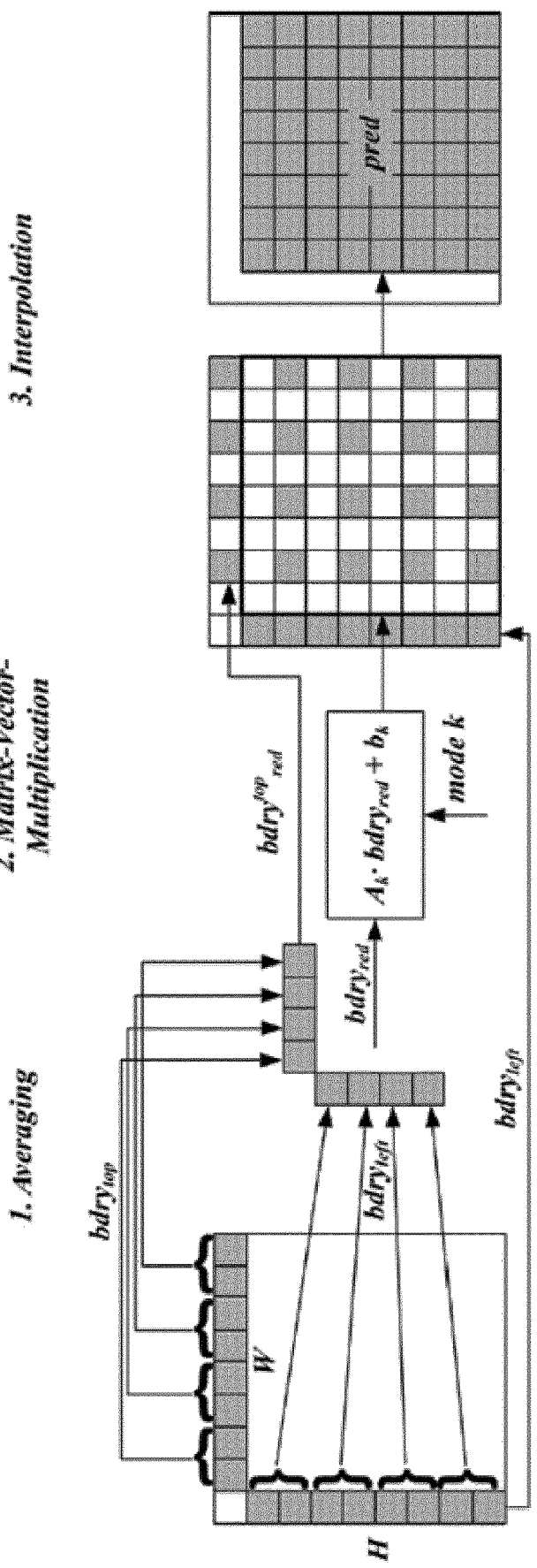
FIG. 8 illustrates an example of generating an MIP prediction signal based on averaging, matrix vector multiplication, and linear interpolation.

Matrix weighted Intra Prediction (MIP) is an intra prediction technique. MIP may be used to predict the samples of a rectangular block of width W and height H. MIP takes a (e.g., one) line of H reconstructed neighboring boundary samples left of the block and a (e.g., one) line of W reconstructed neighboring boundary samples above the block as input. Unavailable reconstructed samples may be generated by other forms of intra prediction. FIG. 8 illustrates an example of generating an MIP prediction signal based on averaging, matrix vector multiplication, and linear interpolation.

A flag (e.g., mip_flag) may be signaled (e.g., for each intra-coded block) to indicate whether a MIP mode is to be applied or not.

Figure 9:
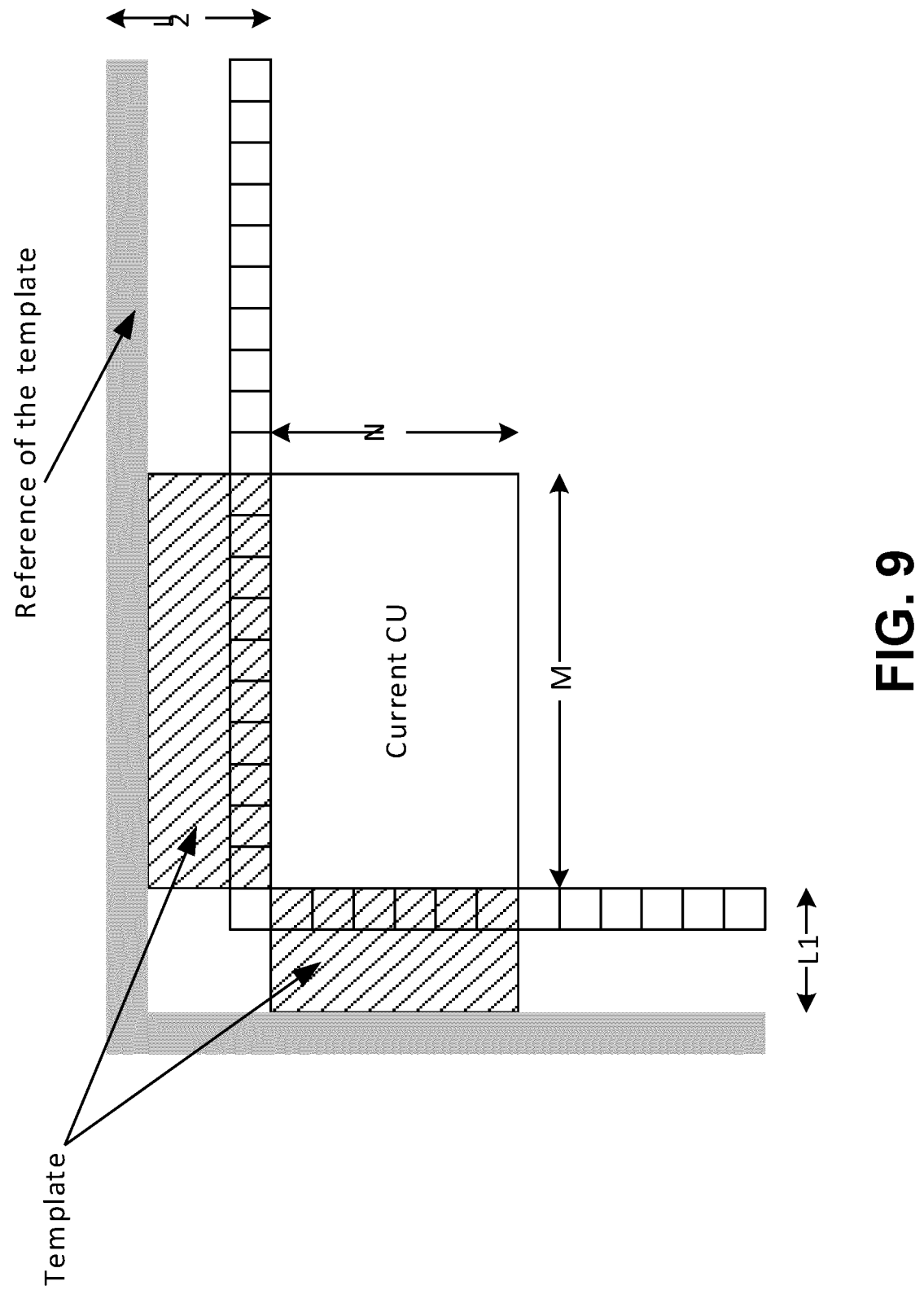
FIG. 9 illustrates an example of determining TIMD modes.

Fusion for template-based intra mode derivation (TIMD) may be implemented. An intra mode used to code a CU may be derived using the Fusion for TIMD. FIG. 9 illustrates an example of determining TIMD modes. As shown in FIG. 9, the Sum of Absolute Transformed Differences (SATD) between the prediction and reconstruction samples of the template may be calculated for each intra prediction mode in most probable modes (MPMs). TIMD modes may be selected, for example, as the first two intra prediction modes with the minimum SATDs. TIMD modes may be fused with weights. The weighted intra prediction may be used to code the current CU.

The costs of the two selected intra prediction modes (IPMs) may be compared with a threshold. A fusion may be applied, for example, if the condition costIPM$_{2nd}$<2*costIPM$_{1st}$ is true. The first IPM (e.g., only the first IPM) may be used, for example, if the condition is false.

A flag (e.g., timd_flag) may be signaled to indicate (e.g., for each intra-coded block) whether a TIMD mode is to be applied or not.

Figure 10:
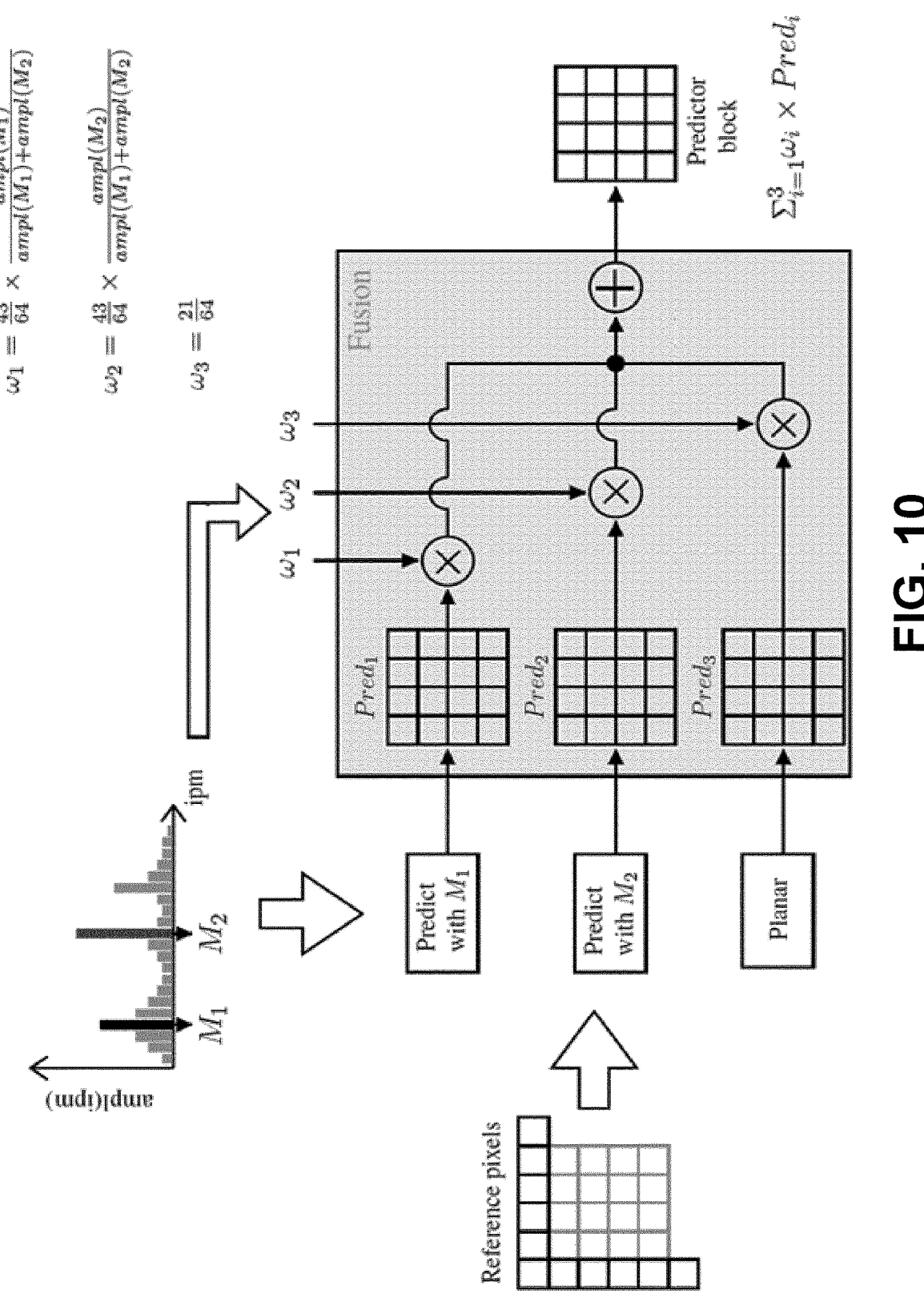
FIG. 10 illustrates an example of DIMD.

Decoder side intra mode derivation (DIMD) may be implemented. DIMD may be used to derive the intra mode used to code a CU. Multiple (e.g., two) intra modes may be derived from reconstructed neighbor samples, for example, if/when DIMD is applied. FIG. 10 illustrates an example of DIMD. As shown for example in FIG. 10, the (e.g., two) predictors may be combined with the planar mode predictor with the weights derived or selected from a histogram of a gradient computed from the neighboring pixels of a current block.

A flag (e.g., dimd_flag) may be signaled (e.g., for each intra-coded block) to indicate whether a DIMD mode is to be applied or not.

The coding efficiency of residual coefficient sign prediction in an intra block may be enhanced, for example, by adapting the cost function to the intra prediction modes. For example, the discontinuity measure across blocks may be adapted to the intra prediction modes.

In some examples, a cost function of the residual coefficient sign prediction may use a fixed border discontinuity measure. The reconstructed neighbors may be from both horizontal and vertical directions to the current pixels. In some examples, more diverse border discontinuity measures may be adapted to intra prediction modes.

Some regions inside a picture may have the strong edge directions and may be predicted with a directional intra mode. Texture of a coding block may be similar to the texture in a top-left adjacent neighborhood. Discontinuities might appear low or non-existent between the coding block and the top-left neighboring block.

A cost function used for residual coefficient sign prediction may be adapted to the intra prediction modes. A cost function process may be based on, for example, one or more of the following cost functions: a horizontal cost function cost$_{horiz}$; a vertical cost function cost$_{vert}$; a diagonal up-right cost function cost$_{diag\_ur}$; a diagonal down-right cost function cost$_{diag\_dr}$; and/or a diagonal down-left cost function cost$_{diag\_df}$. One or more rules to select the cost function may be based on the intra prediction mode and/or the corresponding intra prediction mode index (IPM). IPM may be used interchangeably to refer to an intra prediction mode and an intra prediction mode index. In some examples, a cost function (e.g., for multiple directions) may include weighting factors related to the intra prediction mode and corresponding IPM.

As described herein, a discontinuity measure across a border may be adapted to intra prediction modes. A discontinuity measure across a border may be used to calculate a cost function for residual coefficient sign prediction. Examples are provided for possible cost functions for the residual coefficient sign prediction in an intra-predicted block. Examples are provided for rules that may be used to select the cost function for the different intra prediction modes. Examples are provided for an encoding/decoding process for the adaptive cost functions for the residual coefficient sign prediction.

An across border discontinuity measure may be adapted to intra prediction modes. A cost function of the residual coefficient sign prediction (e.g., as described herein) may be fixed. There may be more than one cost function for an intra-predicted block. In an example, an indication of which cost function is applied may be signaled in video data via a syntax element. In an example, which cost function is applied may be derived based on intra prediction information. A cost function selection of a residual coefficient sign prediction for an intra-predicted block may be decided based on the intra prediction mode and/or the corresponding intra prediction mode index (IPM).

An across border discontinuity measure may be adapted to non-angular modes. In some examples (e.g., for non-angular modes, such as planar (IPM is 0) and DC (IPM is 1), the above and left neighboring reconstructed samples of the current block may be used for measuring border discontinuity.

Figure 11B:
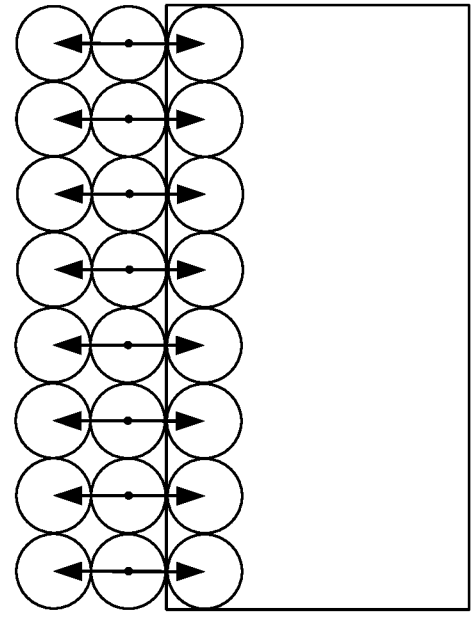
FIGS. 11A-11B illustrate examples of measuring across border discontinuity in horizontal and vertical directions.
Figure 11A:
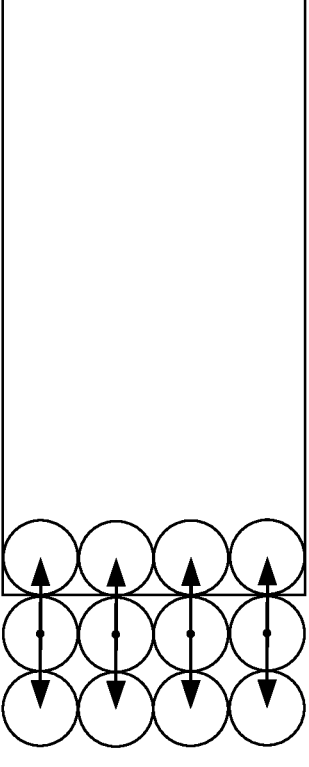

FIGS. 11A-11B illustrate examples of measuring across border discontinuity in horizontal and vertical directions.

An across border discontinuity measure may be adapted to horizontal directional modes. In some examples, such as Horizontal mode (e.g., IPM is 18) and other angular modes whose dominant directions belong to horizontal directions, (e.g., only) left neighboring reconstructed samples and/or prediction samples at the first left column of the current block may be used for measuring border discontinuity, as shown for example in FIG. 11A. A cost function for a residual coefficient sign prediction may be modeled, for example, in accordance with Eq. (4):

$$\text{cost}_{horiz} = \sum_{y=0}^{h} |(-R_{-2,y} + 2R_{-1,y} - P_{0,y}) - r_{0,y}| \tag{4}$$

In some examples, the horizontal directional modes may include multiple (e.g., 16) modes around IPM 18 (e.g., IPM 11 to 26).

An across border discontinuity measure may be adapted to vertical directional modes. In some examples, such as for a vertical mode (e.g., IPM is 50) and other angular modes whose dominant directions belong to vertical directions, (e.g., only) above neighboring reconstructed samples and/or prediction samples at the first top row of the current block may be used for measuring border discontinuity, as shown for example in FIG. 11B. A cost function for the residual coefficient sign prediction may be modeled, for example, in accordance with Eq. (5):

$$\text{cost}_{vert} = \sum_{x=0}^{w} |(-R_{x,-2} + 2R_{x,-1} - P_{x,0}) - r_{x,0}| \tag{5}$$

In some examples, the vertical directional modes may include multiple (e.g., 16) modes around IPM 50 (e.g., IPM 43 to 58).

An across border discontinuity measure may be adapted to diagonal directional modes. Diagonal modes may represent angles that are multiples of 45 degrees. Neighboring samples to be used for a cost function for horizontal and vertical directional modes may be (e.g., directly) selected from adjacent above or left neighbors, for example, without any position shift to the current prediction sample. Selection of neighboring samples for a cost function for diagonal directional modes may involve adaptations. For example, neighbors with 1-pixel and/or 2-pixel position shift to the current prediction sample may be used for measuring border discontinuity.

Diagonal modes may be classified into categories for selecting neighboring samples. In some examples, such as for 45° mode (e.g., IPM is 2), neighboring reconstructed samples from the bottom-left block may impact the prediction dominantly, which may be referred to as diagonal up-right. In some examples, such as for −45° mode (e.g., IPM is 34), neighboring reconstructed samples from the above-left block may impact the prediction dominantly, which may be referred to as diagonal down-right. In some examples, such as for −135° mode (IPM is 66), neighboring reconstructed samples of the above-right block may impact the prediction dominantly, which may be referred to as diagonal down-left.

Figures 12A, 12B, 12C:
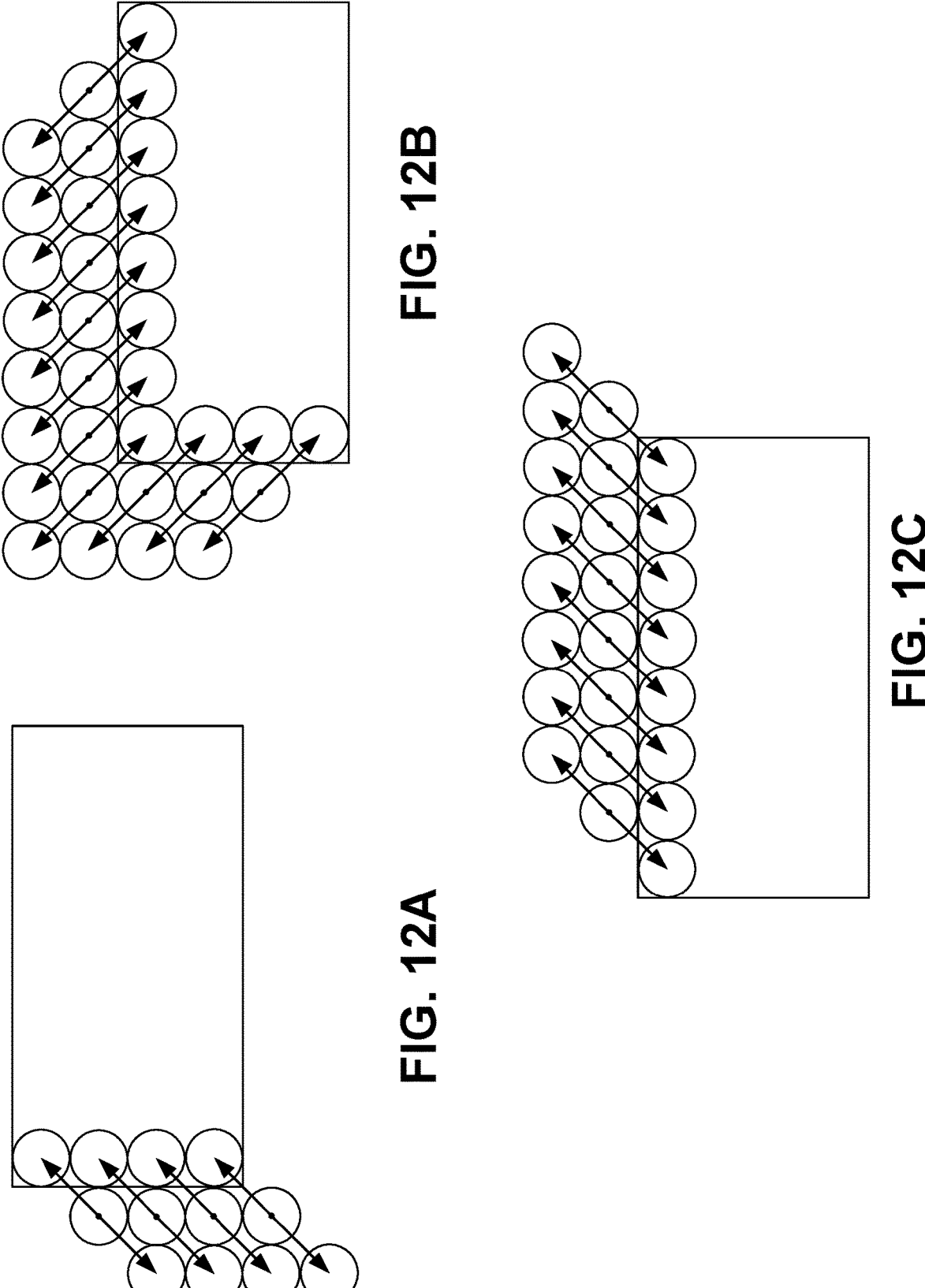
FIGS. 12A-12C illustrate examples of measuring across border discontinuity in diagonal directions.

FIGS. 12A-12C illustrate examples of measuring across border discontinuity in diagonal directions.

An across border discontinuity measure may be adapted to diagonal up-right directional modes. In some examples, such as for diagonal up-right directional mode (e.g., 45° mode, IPM is 2) and other angular modes whose dominant directions belong to diagonal up-right directions, left neighboring reconstructed samples and prediction samples at the first left column of the current block may be used for measuring border discontinuity. The left neighbors may be 1-pixel and/or 2-pixel position down shift to the current prediction sample, as shown for example in FIG. 12A.

For example, for each prediction pixel $P_{0,y}$ at the first left column of the current block, two left neighboring reconstructed pixels with 1-pixel and/or 2-pixel position down shift, $R_{-1,y+1}$ and $R_{-2,y+2}$, may be used to obtain a predicted residual $\text{Resi}_{0,y}$ in accordance with Eq. (6):

$$\text{Resi}_{0,y} = (2R_{-1,y+1} - R_{-2,y+2} - P_{0,y}) \tag{6}$$

A diagonal up-right directional cost function $\text{cost}_{diag\_ur}$ for the residual coefficient sign prediction may be modeled, for example, in accordance with Eq. (7):

$$\text{cost}_{diag\_ur} = \sum_{y=0}^{h} |(-R_{-2,y+2} + 2R_{-1,y+1} - P_{0,y}) - r_{0,y}| \tag{7}$$

In some examples, the diagonal up-right directional modes may be multiple (e.g., 9) modes, which may start from an IPM, such as IPM 2 (e.g., IPM 2 to 10).

In some examples, multiple (e.g., two) left neighboring reconstructed pixels from bottom-left may be unavailable. The unavailable neighboring reconstructed pixels may be replaced by the left neighboring reconstructed pixels without any position shift.

An across border discontinuity measure may be adapted to diagonal down-right directional modes. In some examples, such as for a diagonal down-right directional mode (e.g., −45° mode, IPM is 34) and/or other angular modes whose dominant directions belong to diagonal down-right directions, left neighboring reconstructed samples and above neighboring reconstructed samples may be used for measuring the border discontinuity. For example, left neighboring reconstructed samples positioned 1-pixel and/or 2-pixel up shift to the current prediction sample, and above neighboring reconstructed samples positioned 1-pixel and 2-pixel position left shift to the current prediction sample may be used for measuring border discontinuity, as shown for example in FIG. 12B.

For example, for each prediction pixel $P_{0,y}$ at the first left column of the current block, two left reconstructed pixels with 1-pixel and 2-pixel position up shift, $R_{-1,y-1}$ and $R_{-2,y-2}$, may be used to obtain a predicted residual $\text{Resi}_{0,y}$ in accordance with Eq. (8):

$$\text{Resi}_{0,y} = (2R_{-1,y-1} - R_{-2,y-2} - P_{0,y}) \tag{8}$$

Similar processing may occur for each pixel $P_{x,0}$ in the top row of the current block, where two above reconstructed pixels with 1-pixel and 2-pixel position left shift, $R_{x-1,-1}$ and $R_{x-2,-2}$, may be used to obtain each predicted residual $Resi_{x,0}$ in accordance with Eq. (9):

$$Resi_{x,0} = (2R_{x-1,-1} - R_{x-2,-2} - P_{x,0}) \qquad (9)$$

A cost function for the residual coefficient sign prediction may be modeled, for example, in accordance with Eq. (10)

$$cost_{diag\_ur} = \sum_{x=0}^{w} |(-R_{x-2,-2} + 2R_{x-1,-1} - P_{x,0}) - r_{x,0}| + \qquad (10)$$

$$\sum_{y=1}^{h} |(-R_{-2,y-2} + 2R_{-1,y-1} - P_{0,y}) - r_{0,y}|$$

In some examples, the diagonal down-right directional modes may include multiple (e.g., 16) modes, which may be around the IPM, such as IPM 34 (e.g., IPM 27 to 42).

An across border discontinuity measure may be adapted to diagonal down-left directional modes. In some examples, such as for diagonal down-left directional mode (e.g., −135° mode, IPM is 66) and/or other angular modes whose dominant directions belong to diagonal down-left directions, above neighboring reconstructed samples and prediction samples at the first top row of the current block may be used for measuring border discontinuity. The above neighbors may be 1-pixel and 2-pixel position right shift to the current prediction sample, as shown for example in FIG. 12C.

For example, for each prediction pixel $P_{x,0}$ at the first top row of the current block, two above neighboring reconstructed pixels with 1-pixel and 2-pixel position right shift, $R_{x+1,-1}$ and $R_{x+2,-2}$, may be used to obtain a predicted residual $Resi_{x,0}$ in accordance with Eq. (11):

$$Resi_{x,0} = (2R_{x+1,-1} - R_{x+2,-2} - P_{x,0}) \qquad (11)$$

A cost function used for the residual coefficient sign prediction may be modeled, for example, in accordance with Eq. (12):

$$cost_{diag\_df} = \sum_{x=0}^{w} |(-R_{x+2,-2} + 2R_{x+1,-1} - P_{x,0}) - r_{x,0}| \qquad (12)$$

In some examples, the diagonal down-left directional modes may be multiple (e.g., 8) modes, which may end at the IPM, such as IPM 66 (e.g., IPM 59 to 66).

In some examples, two above neighboring reconstructed pixels from top-right may be unavailable. The unavailable neighboring reconstructed pixels may be replaced by above neighboring reconstructed pixels without any position shift.

An across border discontinuity measure may be adapted to wide-angle intra prediction modes. In some examples, such as for wide angular modes beyond the bottom-left direction (e.g., indexes from −14 to −1), a cost function $cost_{diag\_ur}$ used for diagonal up-right directional modes, such as Eq. (7), may be applied.

In some examples, such as for wide angular modes beyond the top-right direction (e.g., indexes from 67 to 80), a cost function $cost_{diag\_df}$ used for diagonal down-left directional modes, such as Eq. (12), may be applied.

An across border discontinuity measure may be applied to TIMD mode. Selection of a cost function (e.g., in TIMD mode) may be decided by a first best IPM mode ($IPM_{1st}$), for example, if (e.g., only) the first best IPM mode ($IPM_{1st}$) is applied for coding the current CU (e.g., under a condition of $costIPM_{2nd} \geq 2*costIPM_{1st}$). Selection of a cost function may be based on a difference between two IPMs (e.g., $IPM_{1st}$ and $IPM_{2nd}$), for example, if the two TIMD modes are fused with weights. An absolute difference between the two IPMs (e.g., $IPM_{1st}$ and $IPM_{2nd}$) may be compared to a pre-determined threshold TH, for example, if $|IPM_{1st}-IPM_{2nd}| \geq TH$, which may indicate the two IPMs are far away from each other, and a cost function, such as Eq. (3), may be applied; otherwise, the cost function may be decided by the first best IPM mode ($IPM_{1st}$). In some examples, a value of pre-determined threshold TH may be two (2).

An across border discontinuity measure may be applied to MIP and/or DIMD modes. In some examples (e.g., for MIP and DIMD modes), a cost function, such as Eq. (3), using above and left neighboring reconstructed samples of the current block may be used for measuring border discontinuity. Across border discontinuity measure may be applied to other modes as well, such as, for example, combined inter-intra prediction (CIIP) and geometric partitioning mode (GPM).

In some examples (e.g., for an MIP variant), the cost function may be (e.g., fixed) for an (e.g., each) MIP matrix index signaled in the bitstream and coded in a look up table (LUT).

In some examples, a cost function may be implemented for one or more (e.g., all) directions, such as in accordance with Eq. (13):

$$cost = w * \sum_{x=0}^{w} |(-R_{x,-2} + 2R_{x,-1} - P_{x,0}) - r_{x,0}| + \qquad (13)$$

$$(1-w) * \sum_{y=0}^{h} |(-R_{-2,y} + 2R_{-1,y} - P_{0,y}) - r_{0,y}|$$

As shown in Eq. (13), w may be a weighting parameter between the top and the left border continuity cost deduced from the IPM. In some examples, parameters may have one or more of the following values: w=0.5 (e.g., for planar or DC directions); w=0 (e.g., for horizontal direction); w=1 (e.g., for vertical direction); w=0 (e.g., for direction below 18); w=1 (e.g., for direction above 50); and/or w=IPM/32-18/32 (e.g., for direction between 18 and 50). In some examples, the value of w may be deduced from an (e.g., a fixed) LUT mapping between the IPM and the value of w.

Figure 13A:
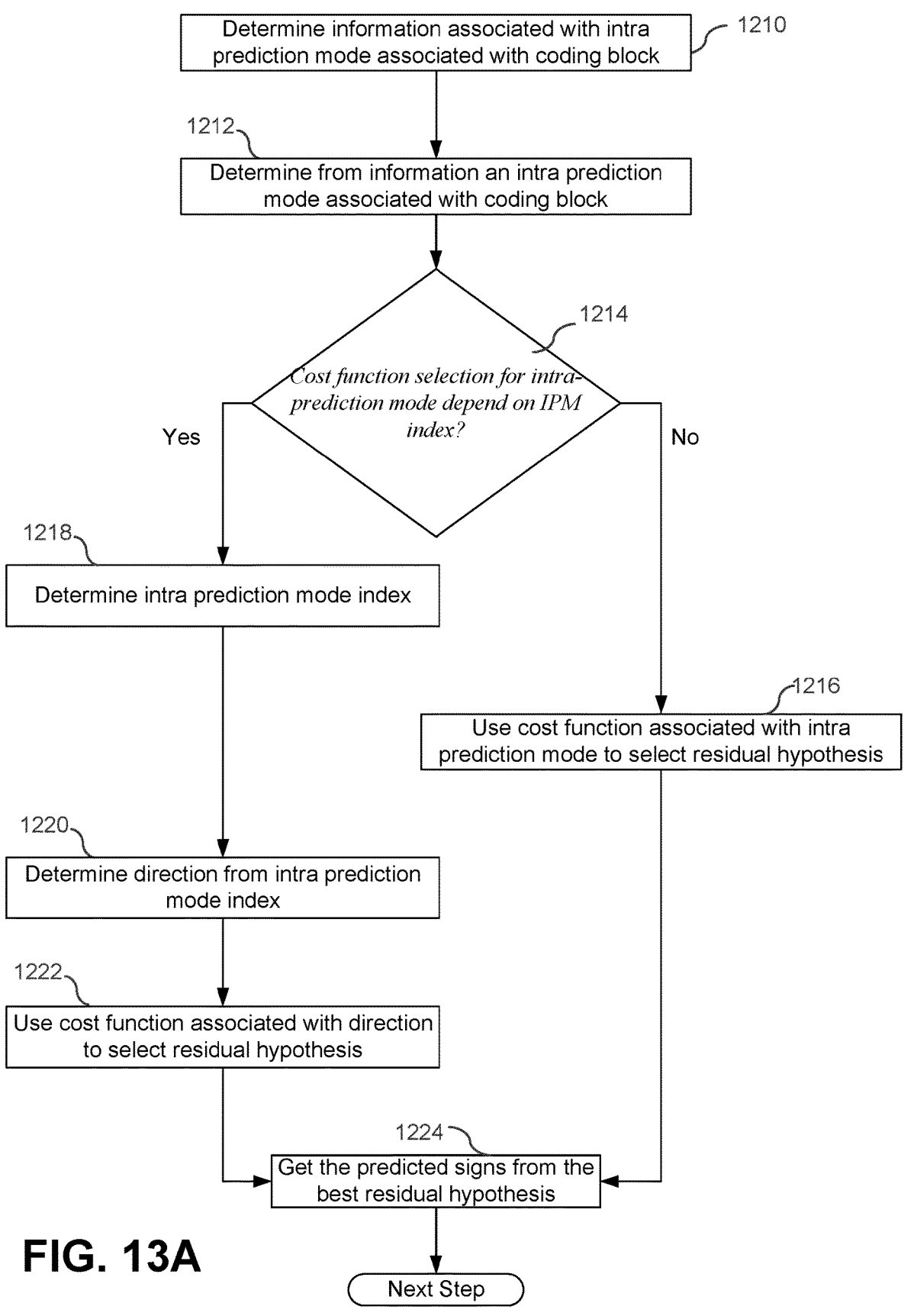
FIG. 13A illustrates an example implementation for an adaptive cost function.

An encoding/decoding process may be implemented for an adaptive cost function. FIG. 13A depicts an example implementation for residual coefficient sign prediction using an adaptive cost function. A video coding device, which may be, for example, a video encoding and/or video decoding device may be configured to determine (1210) information associated with intra prediction mode for a coding block. The information associated with the intra prediction mode may comprise, for example, information specifying an intra prediction mode and/or an intra prediction mode index.

The video coding device may determine (1212) from the information an intra prediction mode associated with the coding block. For example, the video coding device may determine from the information that DIMD mode or MIP mode may be associated with the coding block.

The video coding device may determine (1214) whether for the intra prediction mode associated with the coding block the cost function depends on an intra prediction mode index. If for the intra prediction mode associated with the coding block, the cost function is not dependent on an associated intra prediction mode index, the video coding device may determine to employ a cost function associated the intra prediction mode to select a residual hypothesis (1216). For example, if the video coding device determines that DIMD or MIP are associated with the coding block, the video coding device may determine to employ a standard cost function. A cost function cost, e.g., in accordance with Eq. (3), may be applied, for example, If the video coding device determines (1214) that for the intra prediction mode associated with the coding block the cost function depends on an intra-prediction mode index, the video coding device may determine (1218) an intra prediction mode index from the information associated with the coding block. The intra prediction mode index may be associated with a direction which may include, for example, horizontal, vertical, diagonal up-right, diagonal down-right, or diagonal down-left. The video coding device may determine (1220), based on the intra prediction mode index, at least one direction and may determine and use (1222) a cost function associated with the determined at least one direction to select a residual hypothesis. A cost function cost, e.g., in accordance with one of Eqs. (4), (5), (7), (10), or (12), may be applied, for example, The video coding device may predict (1224) a residual coefficient sign based on the selected cost function, and may decode the coding block based on the predicted residual coefficient sign.

Figure 13B:
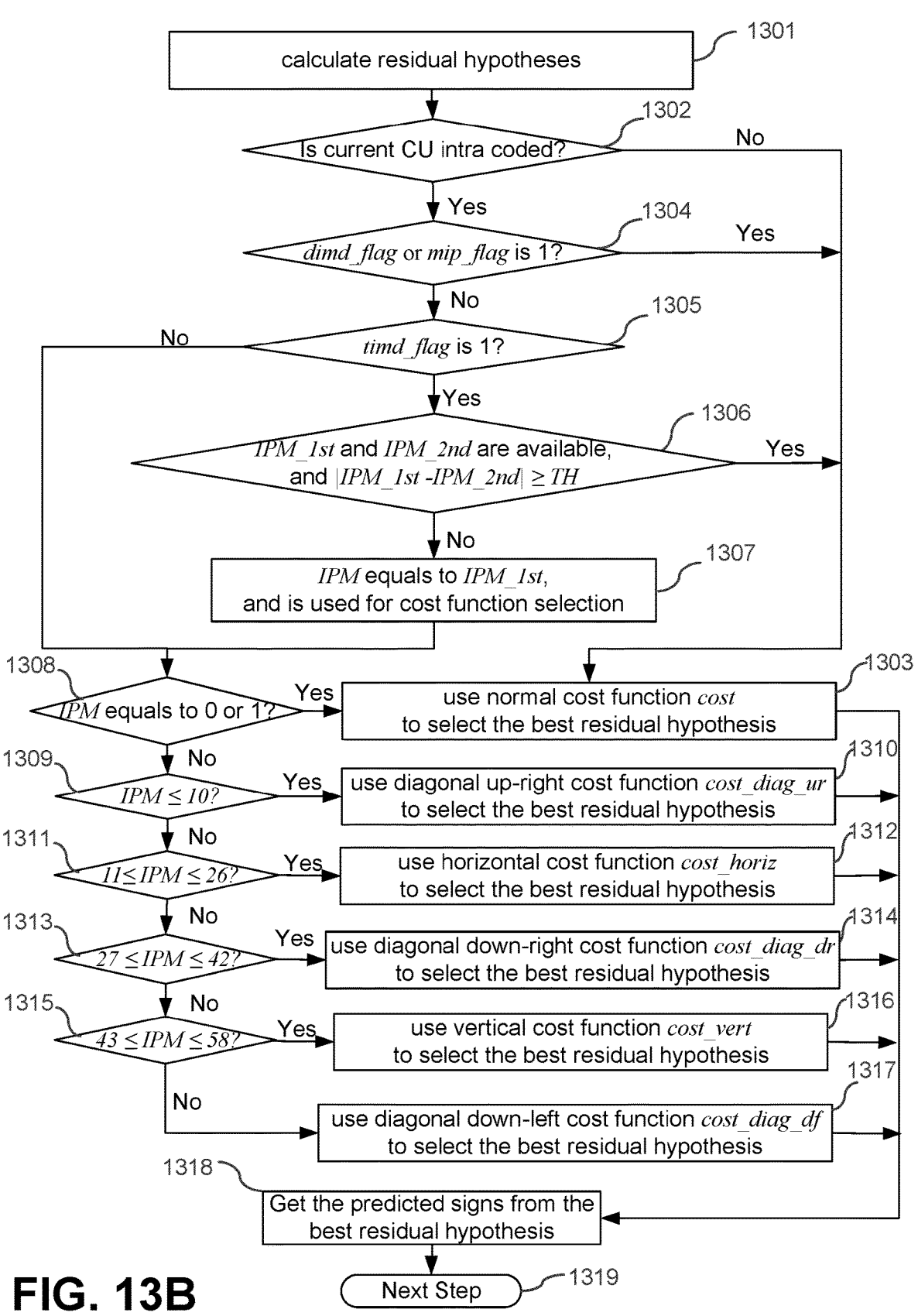
FIG. 13B illustrates an example of encoding/decoding implementation for an adaptive cost function.

FIG. 13B illustrates an example of a TU-level encoding/decoding process for an adaptive cost function. An encoding/decoding process may be implemented during the encoding/decoding of an intra-coded block. The input to the encoding/decoding process may be the current TU to predict the residual coefficient signs.

As shown for example operation in FIG. 13B, example residual hypotheses for negative and/or positive sign combinations may be calculated (1301). A cost function to derive the best residual hypothesis may be obtained (e.g., selected, determined, decided) based on (e.g., all) possible (e.g., proposed) candidates.

A determination may be made whether the prediction mode of the current CU is intra or not (1302). A cost function cost, e.g., in accordance with Eq. (3), may be applied (1303), for example, if the prediction mode of the current CU is not intra-coded (e.g., the determination at 1302 is FALSE).

If the current CU is intra-coded (e.g., the determination at 1302 is TRUE), the intra modes of the current CU may be checked to determine whether the DIMD/MIP prediction process is applied (e.g., whether at least one of the dimd_flag or mip_flag equals to 1) (1304). A cost function cost, e.g., in accordance with Eq. (3), may be applied (1303), for example, if at least one of the dimd_flag or mip_flag equal to 1. A determination may be made whether timd_flag equals to 1 (1305), for example, if neither the dimd_flag nor mip_flag equals to 1.

A cost function cost, e.g., in accordance with Eq. (3), may be applied (1303), for example, if timd_flag equals 1 and if, (at 1306), it is determined that the two IPMs (IPM$_{1st}$ and IPM$_{2nd}$) are available and (e.g., quite or significantly) different from each other (1306). If timd_flag equals 1 and if, (at 1306), it is determined that the two IPMs (IPM$_{1st}$ and IPM$_{2nd}$) are available and the difference between the two IPMs is less than a threshold, one of the two IPMs (e.g., the first best IPM mode IPM$_{1st}$) may be selected (1307) for comparison with predefined ranges (at 1308-1315) to select a cost function. For example, a first of the two IPMs may be used for comparison with the predefined ranges.

As shown, for example, in FIG. 13B, if the intra prediction mode selected to predict the current CU is not a DIMD or an MIP (e.g., determined at 1304), and does not implement TIMD (e.g., determined at 1305), the value of the intra prediction mode index IPM for an IPM (e.g., one of 67+28 IPMs) may be compared with predefined ranges (e.g., at 1308-1315) to select a cost function.

A (e.g., default, normal, standard) cost function cost (e.g., as shown by Eq. (3) may be applied (1303), for example, if IPM equals 0 or 1 (1308), which may indicate non-angular modes (e.g., planar and DC). Otherwise, if IPM does not equal 0 or 1 (1308), a determination is made whether IPM is smaller or equal than 10 (1309).

A diagonal up-right cost function cost$_{diag\_ur}$ (e.g., as shown by Eq. (7) may be applied (1310), for example, if IPM is smaller or equal than 10 (1309). Otherwise, if IPM is larger than 10 (1309), a determination is made whether IPM belongs to the horizontal directional modes range [11, 26] (1311).

A horizontal cost function cost$_{horiz}$ (e.g., as shown by Eq. (4) may be applied (1312), for example, if IPM belongs to the horizontal directional modes range [11, 26] (1311). Otherwise, if IPM does not belong to the horizontal directional modes range [11, 26] (1311), a determination is made whether IPM belongs to the diagonal down-right directional modes range [27, 42] (1313).

A diagonal down-right cost function cost$_{diag\_dr}$ (e.g., as shown by Eq. (10) may be applied (1314), for example, if IPM belongs to the diagonal down-right directional modes range [27, 42] (1313). Otherwise, if IPM does not belong to the diagonal down-right directional modes range [27, 42] (1313), a determination is made whether IPM belongs to the vertical directional modes range [43, 58] (1315).

A vertical cost function cost$_{vert}$ (e.g., as shown by Eq. (5)) may be applied (1316), for example, if IPM belongs to the vertical directional modes range [43, 58] (1315). Otherwise, if IPM does not belong to the vertical directional modes range [43, 58] (1315), which may indicate IPM is larger or equal than 59, the diagonal down-left cost function cost$_{diag\_dl}$(e.g., as shown by Eq. (12) may be applied (1317).

A predicted sign may be obtained from the (e.g., best) residual hypothesis that minimizes the selected cost function (1318). The process (e.g., algorithm) may proceed to the next step, for example, if/when the residual coefficient signs of the current TU are predicted.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A device for video decoding, comprising:
a processor configured to:
   determine template-based intra mode derivation (TIMD) mode is associated with a coding block;
   determine an intra prediction mode (IPM) index associated with the coding block;
   select, based on TIMD mode being associated with the coding block and the IPM index associated with the coding block, a cost function from a plurality of cost functions for predicting a residual hypothesis for the coding block;
   predict a residual coefficient sign based on the selected cost function; and
   decode the coding block based on the predicted residual coefficient sign.

2. The device of claim 1,
wherein the processor is further configured to:
obtain the plurality of cost functions for predicting the residual hypothesis, wherein each of the plurality of cost functions is associated with a respective intra prediction direction.

3. The device of claim 2,
wherein the processor configured to obtain the plurality of cost functions for predicting the residual hypothesis is configured to use intra prediction values to deduce one or more weighting factors to generate one or more of the plurality of cost functions.

4. The device of claim 1,
wherein the IPM index is associated with one of a horizontal direction, a vertical direction, a diagonal up-right direction, a diagonal down-right direction, or a diagonal down-left direction.

5. The device of claim 1,
wherein the IPM index is associated with a horizontal direction;
wherein the selected cost function is associated with the horizontal direction; and
wherein the selected cost function is based on a residual hypothesis, a plurality of reconstructed neighbor pixels to a left of the coding block, and a plurality of predicted sample values on a left edge of the coding block.

6. The device of claim 1,
wherein the IPM index is associated with a vertical direction;
wherein the selected cost function is associated with the vertical direction; and
wherein the selected cost function is based on a residual hypothesis, a plurality of reconstructed neighbor pixels located above the coding block, and a plurality of predicted sample values on a top edge of the coding block.

7. A method of video decoding comprising:
determining template-based intra mode derivation (TIMD) mode is associated with a coding block;
determining an intra prediction mode (IPM) index associated with the coding block;
selecting, based on TIMD mode being associated with the coding block and the IPM index associated with the coding block, a cost function from a plurality of cost functions for predicting a residual hypothesis for the coding block;

predicting a residual coefficient sign based on the selected cost function; and
decoding the coding block based on the predicted residual coefficient sign.

8. The method of claim 7, further comprising:
obtaining the plurality of cost functions for predicting the residual hypothesis, wherein each of the plurality of cost functions is associated with a respective intra prediction direction.

9. The method of claim 8,
wherein obtaining the plurality of cost functions for predicting the residual hypothesis comprises using intra prediction values to deduce one or more weighting factors to generate one or more of the plurality of cost functions.

10. The method of claim 7,
wherein the IPM index is associated with one of a horizontal direction, a vertical direction, a diagonal up-right direction, a diagonal down-right direction, or a diagonal down-left direction.

11. The method of claim 7,
wherein the IPM index is associated with a horizontal direction;
wherein the selected cost function is associated with the horizontal direction; and
wherein the selected cost function is based on a residual hypothesis, a plurality of reconstructed neighbor pixels to a left of the coding block, and a plurality of predicted sample values on a left edge of the coding block.

12. The method of claim 7,
wherein the IPM index is associated with a vertical direction;
wherein the selected cost function is associated with the vertical direction; and
wherein the selected cost function is based on a residual hypothesis, a plurality of reconstructed neighbor pixels located above the coding block, and a plurality of predicted sample values on a top edge of the coding block.

13. A device for video encoding, comprising:
a processor configured to:
   determine template-based intra mode derivation (TIMD) mode is associated with a coding block;
   determine an intra prediction mode (IPM) index associated with the coding block;
   select, based on TIMD mode being associated with the coding block and the IPM index associated with the coding block, a cost function from a plurality of cost functions for predicting a residual hypothesis for the coding block;
   predict a residual coefficient sign based on the selected cost function; and
   decode the coding block based on the predicted residual coefficient sign.

14. The device of claim 13,
wherein the processor is further configured to:
obtain the plurality of cost functions for predicting the residual hypothesis, wherein each of the plurality of cost functions is associated with a respective intra prediction direction.

15. The device of claim 14,
wherein the processor configured to obtain the plurality of cost functions for predicting the residual hypothesis is configured to use intra prediction values to deduce one or more weighting factors to generate one or more of the plurality of cost functions.

16. The device of claim 13, wherein the IPM index is associated with one of a horizontal direction, a vertical direction, a diagonal up-right direction, a diagonal down-right direction, or a diagonal down-left direction.

17. A method of video encoding comprising:

determining template-based intra mode derivation (TIMD) mode is associated with a coding block;

determining an intra prediction mode (IPM) index associated with the coding block;

selecting, based on TIMD mode being associated with a coding block and the IPM index associated with the coding block, a cost function from a plurality of cost functions for predicting a residual hypothesis for the coding block;

predicting a residual coefficient sign based on the selected cost function; and decoding the coding block based on the predicted residual coefficient sign.

18. The method of claim 17, further comprising:

obtaining the plurality of cost functions for predicting the residual hypothesis, wherein each of the plurality of cost functions is associated with a respective intra prediction direction.

19. The method of claim 18, wherein obtaining the plurality of cost functions for predicting the residual hypothesis comprises using intra prediction values to deduce one or more weighting factors to generate one or more of the plurality of cost functions.

20. The method of claim 17, wherein the IPM index is associated with one of a horizontal direction, a vertical direction, a diagonal up-right direction, a diagonal down-right direction, or a diagonal down-left direction.

* * * * *